July 14, 1959  B. A. RUNDE ET AL  2,894,615
CARRIAGE MOVEMENT CONTROLS FOR ACCOUNTING MACHINES
Original Filed July 18, 1955  3 Sheets-Sheet 1

INVENTORS.
BYRON A. RUNDE
IRVIN W. BORUTZKE
BY
Fidler, Crouse & Beardsley
ATTORNEYS

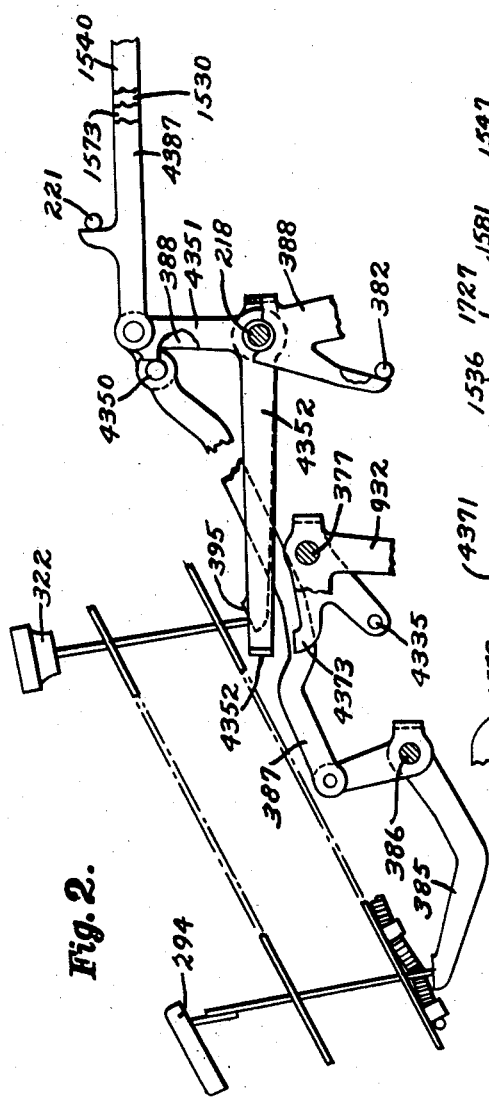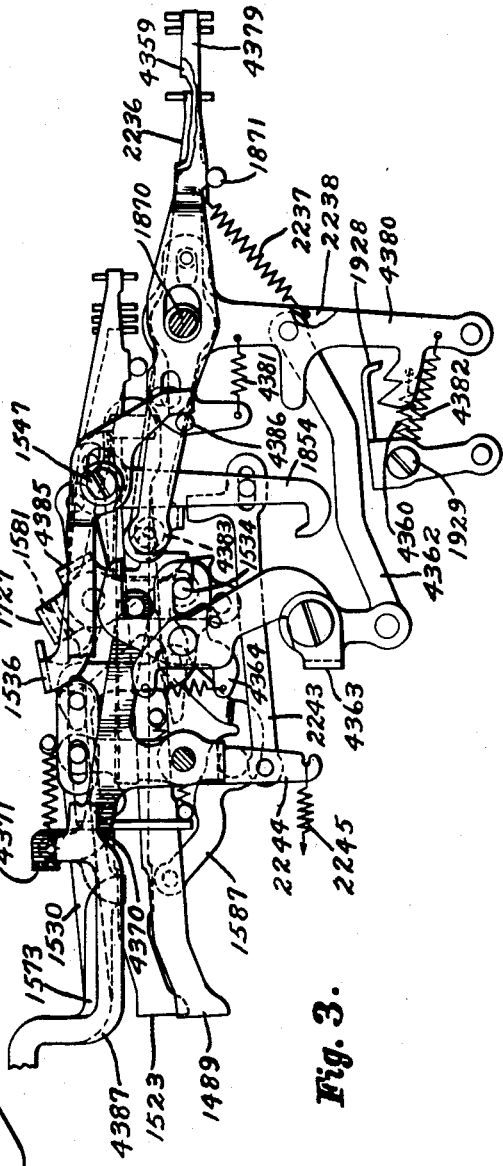

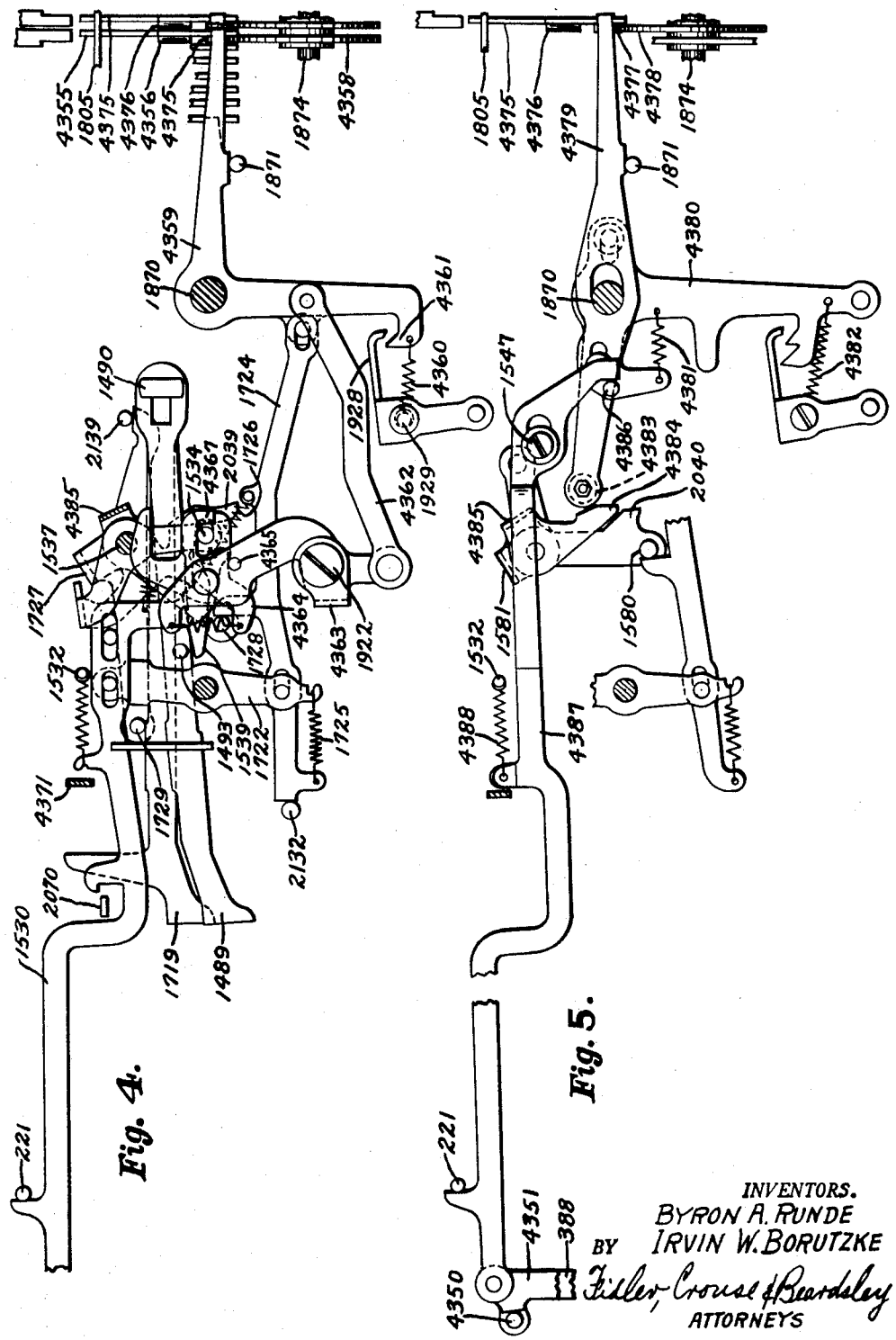

United States Patent Office 2,894,615
Patented July 14, 1959

2,894,615

CARRIAGE MOVEMENT CONTROLS FOR ACCOUNTING MACHINES

Byron A. Runde, Farmington, and Irvin William Borutzke, Detroit, Mich., assignors to Burroughs Corporation, Detroit, Mich., a corporation of Michigan Original application July 18, 1955, Serial No. 522,430. Divided and this application January 30, 1957, Serial No. 637,282

3 Claims. (Cl. 197—177)

This invention relates to improvements in accounting machines and is concerned more particularly with improvements in the carriage movement controls of such machines.

In some kinds of accounting or bookkeeping work, such for example as the posting of commercial checking accounts in banks, it is frequently necessary for the machine operator to post amounts which represent groups of items which often are not prelisted and totaled before they are received by the machine operator, so that the latter is then required to list and total such groups of items before proceeding with the posting operation.

In the use of prior machines for such work it has been possible in many cases to permit the listing and totaling of such item groups in a special column on the work forms when they are received by the machine operator without having been prelisted and totaled, but in such cases it has heretofore been necessary for the machine operator in so listing and totaling the groups of items to set or operate special controls, other than those normally required to be operated in the posting of amounts, to cause the paper carriage to remain in the special columnar position during the listing and totaling of such a group of items and/or to cause the paper carriage to move to the proper columnar position for posting the item group total amount after the listing and totaling of the group has been completed.

It is an object of the present invention to provide improved carriage movement controls whereby the paper carriage may remain in a predetermined columnar position through successive machine operations for entering successive items of a group and, in the final operation, will automatically move to the desired columnar position without requiring the machine operator, for the purpose of obtaining such control of carriage movements, to select, set, or operate any special manipulative controls, and thereby significantly lighten both the mental and physical effort required of the operator in such work.

The foregoing and other features of the invention are hereinafter more particularly described with reference to the accompanying drawings in which:

Fig. 2 is a right side elevation of portions of carriage movement controls associated with the crossfooter subtotal key and the lowermost motor bar and a register function control part associated with said crossfooter subtotal key;

Fig. 3 is a right side elevation of the mechanism of Fig. 1 together with a further automatic control of carriage movement and means operable by the crossfooter subtotal key to disable that automatic control; and Figs. 4 and 5 are separate right side elevations of two of the automatic control mechanisms of Fig. 2; each with means operable by the crossfooter subtotal key to disable them.

GENERAL

Figure 1:
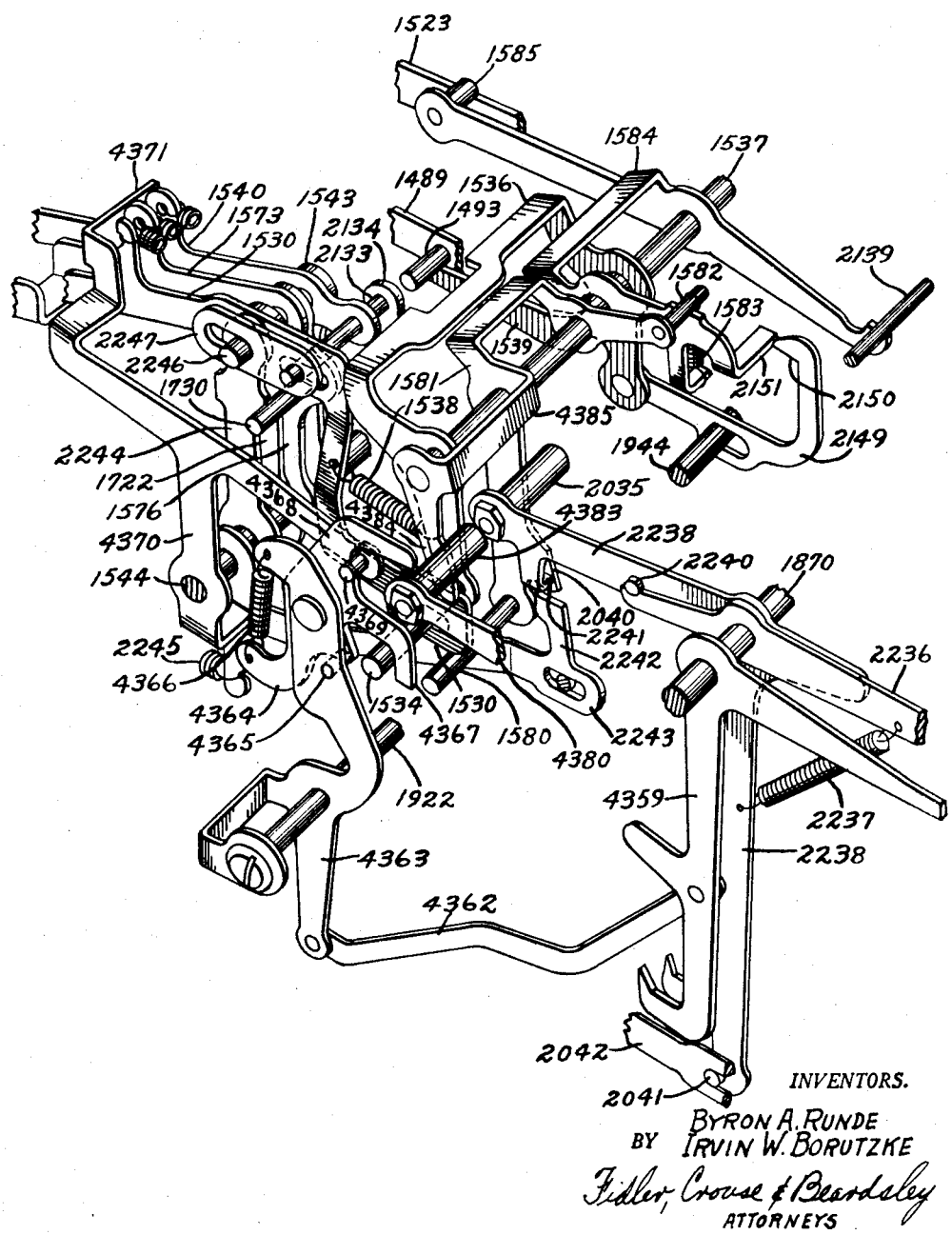
Figure 1 is a spread perspective of portions of automatic and manual carriage movement controls embodying the invention.

The invention is herein disclosed as embodied, by way of example, in an accounting machine constructed as disclosed in Patent No. 2,629,549 issued Feb. 24, 1953, to Thomas M. Butler with the modifications disclosed in application Ser. No. 242,623 filed August 20, 1951 by Byron A. Runde, now patent No. 2,807,412, and with further modifications disclosed in application Ser. No. 522,430, filed July 18, 1955, of which the present application is a division. The above three cases are referred to subsequently herein as the Butler patent, the Runde application, and the parent application.

Those elements of the illustrated machine which are disclosed in prior patents or applications are designated in the following description and accompanying drawings by the same reference numbers by which they are identified in such prior patents and applications. Reference numbers in parenthesis identify elements disclosed in the Butler patent or in the Runde application but not shown in the annexed drawings or in the drawings of the parent application. Mechanisms, parts and elements newly disclosed in the parent application are designated by reference numbers above 4100.

Consistently with the descriptions in the above-mentioned Butler patent and the Runde application, the terms "clockwise" and "counterclockwise" will be applied to rotary or swinging movements of parts as viewed from the front, top, or right side of the machine, and the terms "forward," "rearward," "rightward," "leftward," "upward" and "downward" will be applied to movements or positions of the parts as viewed normally from the front of the machine.

The paper carriage (Fig. 1 of the parent application) is substantially like that of the Butler patent except that the platen 1057 is split to provide a short left section 1075L which is intended to support a tally strip and is rotatable for line-spacing independently of the main right hand section 1057R.

The manual and automatic function controls of the machine are like those of the Butler patent modified as disclosed in the Runde application and further modified as described in detail in the parent application and hereinafter.

LISTING, COUNTING AND TOTALING AMOUNTS AND COUNTS OF GROUPS OF ITEMS

Frequently, items to be posted in an accounting machine may be received by the machine operator in groups. Such a group of items may or may not be accompanied by a list previously prepared on an adding machine tape and showing the count and amount totals of the group of items. When such a pre-list is present, the operator of the present machine may enter the count total of the group on the count keys and the amount total on the amount keys before operating the machine with the paper carriage in the appropriate item columnar position, all in a manner described in the parent application. When no pre-list is provided, the operator may of course enter the items singly with the carriage in such appropriate item columnar position so that the automatically controlled crossfooter and/or register counting mechanisms will accumulate the desired correct count in the manner described in the parent application, but it is frequently desirable that suitable lists of the grouped items be prepared on tally strips separate from the ledger and journal or other work forms. The carriage of the present machine, as described in the parent application, has a split platen, the left section of which is separately line-spaceable and of appropriate width for a continuous tally strip, indicated at 4348 in Figs. 1 and 21 of the parent application, upon which group item lists may be prepared. To avoid tying up one of the B registers for that purpose, the group amount and count totals are produced in the A crossfooter which must, therefore, be in a clear condition at the start of the listing operation. After completing the previous posting and before entering the old balance pick-up for the account to which the unlisted group of items is to be posted, the operator will depress the carriage right shift key 1518 to shift the carriage to the tally strip listing columnar position before starting the listing operation. It is necessary that the paper carriage should not tabulate out of the listing columnar position until the list is completed. To minimize the amount of effort required from the operator for such work, the present machine has provisions to effect line-spacing of the platen and non-tabulation of the carriage in operations initiated by depression of the Main motor bar 291 so that the operator is not required to reach farther for the small vertical motor bar 293, and to secure skip-tabulation of the paper carriage past the old balance pick-up position to the appropriate item position in a machine cycle initiated by depression of the crossfooter subtotal key 322 to complete the list by printing the group count and amount totals thereon. The operator's work is further speeded up and made easier because the count and amount totals are printed in the appropriate item column by a repeat crossfooter subtotal operation after which the carriage automatically returns to the old balance pick-up position. To obtain such advantageous results it has been necessary to solve several problems and provide additional controls as described hereinafter.

In connection with the following description of the new controls of carriage tabulating and return movement and line-spacing, it should be noted that the controls associated with the small motor bars 292, 293 and 294 are the same as those of the preferred form of machine shown in Figs. 1 to 175 of the Butler patent, although certain elements found in the modification shown in Fig. 176 of the Butler patent are included in the present machine as specifically pointed out hereinafter. As shown in Fig. 1, the links 1540, 1530 and 1573, which are pulled forwardly by depression of the small motor bars 292, 293 and 294, respectively, are connected to the upper ends of the levers 1543, 1722 and 1576, respectively, as shown in Fig. 152 of the Butler patent so that in machine cycles initiated by depressions of those motor bars, the uppermost bar 292 causes skip-tabulation of the carriage to columnar positions determined by the lane 1 control, the upper bar 293 (Vertical) disables both tabulation and return of the carriage but causes line-spacing, and the lowermost bar 294 normally—that is, when neither the lane 15 control nor the lane 20 control hereinafter described is effective—causes return movement of the carriage but, when the lane 15 control or the lane 20 control is effective, causes either a lane 1 controlled skip-tabulation of the carriage or, if the lane 3 control is also effective, a lane 3 controlled skip-tabulation.

As shown in Figs. 1 and 3, the present machine includes the modified form of lane 15 control shown in Fig. 176 of the Butler patent rather than the form of lane 15 control shown in Fig. 152 of that patent. In machine cycles in which the lane 15 control is not blocked, a #5 control projection 1767 encountered by the lane 15 sensing pin causes the lane 15 bell crank 2238 to be rocked to lower the roller 2035 far enough to restore the carriage return control yoke 1584 and the line-spacing control yoke 1727 (Fig. 4) to normal and thus prevent carriage return and line-spacing, and a #7 projection 1767 in lane 15 causes the bell crank 2238 to be rocked to a lesser extent to lower the roller 2035 only far enough to return the yoke 1727 to normal and thus prevent line spacing. The lane 15 bell crank 2238 (Fig. 1) is operated by the lane 15 sensing control lever 1843 through a yieldingly connected arm 2236 and has a lug 2241 normally blocked by an upward projection 2242 on a link 2243 slidably supported at its rearward end on a stud secured in the downward arm of the lane 4 bell crank 1854 (Fig. 3) instead of being pivotally connected with the latter to operate the latter as shown in Fig. 176 of the Butler patent. The forward end of the link 2243 is pivotally connected to the lower arm of a lever 2244 which is pivoted intermediate its ends on the stud 1544, urged clockwise by a spring 2245, and carries in its upper end a stud 2246 embraced in a slot in a short link 2247 pivotally supported at its rear end on the stud 2133 secured in the rearward end of the link 2134 and engaged in the rearward end of the link 1540 which is pulled forwardly by depression of the uppermost small motor bar 292. The stud 1730 in the upper arm of the lever 1576 which is rocked counterclockwise by depression of the lowermost motor bar 294 also extends rightwardly behind the upper arm of the lever 2244. Thus, the lane 15 control in the present machine is blocked in all machine cycles except those initiated by depression of either the uppermost motor bar 292 or the lowermost motor bar 294 to shift the link 2243 rearwardly to displace its projection 2242 from under the projection 2241 on the lane 15 bell crank 2238.

*Control of carriage movements by crossfooter subtotal key*

As mentioned above, when the machine is operated with the carriage in the item columnar position to again take from the A crossfooter the subtotal of the amounts of the items entered in the listing column, the paper carriage will move in the return direction to the old balance pick-up columnar position. For that purpose, the stud which previously pivotally connected the rear end of the link 387 (Fig. 2), which is pulled forwardly by depression of the lowermost motor bar 294, to the upper arm of the lever 388, to which the forward end of the link 1573 is also pivotally connected, has been replaced by a lengthened stud 4350 which extends rightwardly in front of the upper arm 4351 of a lever pivotally mounted on the shaft 218 and having a forward arm 4352 extending under the stem of the A crossfooter subtotal key 322 (Fig. 2). Thus, depression of the subtotal key 322 pulls the stud 4350, the upper arm of the lever 388, and the link 1573 forwardly. The latter, just as when it is pulled forwardly by depression of the lowermost motor bar 294 rocks the lever 1576 (Fig. 1) counterclockwise so that the latter, through the stud 1730 secured therein, rocks also the levers 1722 and 1543 to effectively condition the line-spacing mechanism and prepare the lane 1 skip-tabulation control and, through the tension spring 1579, pushes rearwardly the link 1578 which partially conditions the lane 2 and lane 3 controls and acts on the stud 1580 to rock the carriage return control yoke 1581 counterclockwise to condition the carriage movement controls to cause a lane 2 controlled return movement of the carriage unless the yoke 1581 is returned to normal by the roller 2035 of the lane 15 control, in which case a lane 3 or a lane 1 controlled skip-tabulation of the carriage will result accordingly as a control projection 1784 is or is not also encountered by the lane 3 sensing pin.

*Lane 19 automatic control line-spacing of platen non-tabulation of carriage*

While entering successive items of a group with the carriage in the listing position, the normal tabulation of the carriage is suppressed. For that purpose, the previously unused automatic control lane 19 is utilized.

A sensing pin 4355 (Fig. 4) in the lane 19 position in the sensing pin row is connected with the rightward end of a sensing control lever 4356 which carries a roller 4357 bearing on the lane 19 control operating cam 4358 secured on the sensing control actuating shaft 1874 and of the same configuration as the lane 7 cam (1899). The leftward end of the control lever 4356 engages under the rearward arm of a bell crank 4359 pivotally mounted on the stud 1870 and urged clockwise by a tension spring 4360 connected between the stud 1929 and the downward arm of said bell crank which has a latching projection 4361 adapted to engage behind the lip of the latch bail 1928 when the bell crank is rocked counterclockwise by the control lever 4356. The downward arm of the bell crank 4359 is also pivotally connected with the rear end of a link 4362 (Figs. 1 and 4) which is pivotally connected at its forward end to the lower arm of a lever 4363 pivotally mounted on the stud 1922. A pawl 4364 pivotally mounted on the upper arm of the lever 4363 is urged clockwise into engagement with a limit stud 4365 in the lever 4363 by a tension spring 4366 connected between a forward arm of the pawl and the upper end of the lever 4363. The pawl 4364 has a lower rearward hook portion 4367 normally extending downwardly behind the stud 1534. The pawl 4364 also has a finger 4368 extending upwardly in front of and rearwardly over a stud 4369 in the rearward arm of a lever 4370 pivotally mounted on the stud 1544 and having a forward arm 4371 extending leftwardly immediately in front of the upwardly projecting spring-connecting ears on the links 1573 and 1540. The corresponding ear on the link 1530 has its forward edge cut back so as not to engage the arm 4371. When either the link 1540 is pulled forwardly by depression of the uppermost motor bar 292 or the link 1573 is pulled forwardly by depression of either the lowermost motor bar 294 or the A crossfooter subtotal key 322, the lever 4370 is rocked counterclockwise so that its stud 4369 rocks the pawl 4364 also counterclockwise to swing its hook 4367 clear of the stud 1534.

In a machine cycle in which neither the subtotal key 322 nor either of the motor bars 292 or 294 is depressed but in which a #5 control projection 1767 is encountered by the lane 19 sensing pin 4355, the rightward end of the lane 19 control lever 4356 is elevated to rock the bell crank 4359 to latch its projection 4361 behind the latch bail 1928 and pull the link 4362 rearward to rock the lever 4363 counterclockwise so that the hook 4367 pulls the stud 1534 forwardly approximately as far as the latter would be pulled by the link 1530 upon depression of the motor bar 293. The yoke 1536 carrying the stud 1534 is thereby rocked clockwise so that its forwardly extending left side arm 1539 engaging the stud 1493 in the carriage tabulation control slide 1489 elevates the latter to inactive position and thereby suppresses the normal tabulation of the paper carriage in that machine cycle. Such forward movement of the stud 1534, which projects through a slot in the rear end of the link 1530, also moves the latter forwardly to rock the lever 1722 counterclockwise. The link 1724, which is connected to the lower end of the lever 1722 through the spring 1725 and to the line-spacing control yoke 1727 through the spring 1726, is thereby pushed rearwardly and rocks the yoke 1727 to lower the line-spacing control slide 1719 to active position to cause the line-spacing mechanism to operate in the machine cycle. If the carriage is in the listing position with the tally strip section of the platen opposed to the printing type bars, that section of the platen will be line-spaced rather than the right-hand section of the platen which is rotated by operation of the line-spacing mechanism when it is opposed to the type bars.

Thus, a #5 control projection 1767 in the listing columnar position in lane 19 will prevent the paper carriage from tabulating out of the listing position and will cause line-spacing of the listing tape in each of a series of machine cycles initiated by the main motor bar 291 for listing the successive items of a group. In those machine operations the amounts of the items will normally be accumulated in the amount section of the A crossfooter and, if a #4 control projection 1767 is present in the listing columnar position in lane 24, an automatic count of the items will be accumulated simultaneously in the count section of the crossfooter. Then, when the list is completed by printing the sums of the counts and the amounts of the listed items in a machine cycle initiated by depression of the A crossfooter subtotal key 322, the hook 4367 of the pawl 4364 will be clear of the stud 1534 and the lane 19 control will be ineffective to prevent tabulation of the paper carriage. If a #5 control projection 1767 is also present in the listing columnar position in lane 15 and a control projection 1784 is present in the same columnar position in lane 3 as previously suggested, the return movement of the carriage which would otherwise follow the forward movement of the link 1573 by depression of the subtotal key 322 will be replaced by a lane 3 controlled skip-tabulation which can be terminated in the appropriate item columnar position by a long projection 1784 located in lane 3 a little ahead of the latter columnar position.

*Lane 20 control skip-tabulation*

It is desirable to employ the lowermost motor bar 294 as a "balance bar" to initiate the machine cycle for entering the last debit or credit item in a posting, to cause a tabulation or skip tabulation of the carriage to the new balance columnar position and then to initiate automatically a machine cycle in which an automatic total-taking operation of the crossfooter will be performed under control of the lane 6 control mechanism. When the lane 15 control is employed as previously indicated to obtain a skip-tabulating movement of the carriage instead of a return movement in consequence of the rearward movement of the link 1573 by the crossfooter subtotal key 322 when the latter is depressed with the carriage in the listing columnar position, the same control cannot be employed to produce a skip-tabulating movement of the paper carriage when the same link 1573 is pulled rearwardly by depression of the lower motor bar 294 to initiate a machine cycle with the carriage in the item columnar position from which, in a machine cycle initiated by depression of the crossfooter subtotal key 322, the carriage should return to the old balance pick-up position. A further automatic control is needed, for which lane 20 is now employed.

A sensing pin 4375 (Fig. 5) guided in the lane 20 aperture in the guide plate 1805 is connected at its lower end to the leftward end of the lane 20 control lever 4376 which carries a roller 4377 bearing on the edge of the lane 20 cam disc 4378 secured on the shaft 1874. The rightward end of the control lever 4376 is located under the rearward end of an arm 4379 forwardly and rearwardly slidably mounted on studs secured in a bell crank 4380 and normally urged to its rearward limit on those studs by a tension spring 4381. The bell crank 4380 is pivotally supported on the shaft 1870 and urged clockwise by a tension spring 4382 which normally maintains the arm 4379 engaged downwardly against the limit stud 1871. The forward arm of the bell crank 4380 carries a roller 4383 normally located above a downwardly and rearwardly extending cam arm 4384 on a rightwardly extending yoke portion 4385 which has been added to the carriage return control yoke 1581. A stud 4386 secured in the forward portion of the slidable arm 4379 is normally located immediately in front of a downward finger on the rear end of a link 4387 slidably guided on the stud 1547 and normally held at its rearward limit against the limit stud 221 by a tension spring 4388. The forward end of the link 4387 is pivotally connected to the upward arm of the lever 4351 so that when the latter is rocked counterclockwise by depression of the A crossfooter subtotal key 322, the link 4387 and the arm 4379 are pulled forwardly to disengage the latter from the control lever 4376 and thereby render the lane 20 control ineffective.

When, in a machine cycle in which the link 1573 is pulled forwardly by the depression of the lowermost motor bar 294, and not by depression of the cross-footer subtotal key 322, the lane 20 sensing pin 4375 encounters a #5 control projection 1767, the rightward end of the control lever 4376 will be elevated and will rock the bell crank 4380 far enough to engage its front latch tooth 4389 behind the lip of the latch bail 1928 and to lower the roller 4383 far enough to act on the cam 4384 to restore the carriage return control yoke 1581 to normal ineffective position so that a skip-tabulating movement of the carriage will be obtained.

As in the machine of the Butler patent, the latch bail 1928 is moved to releasing position at a point so late in the machine cycle that the return of the bell crank 4380 or the lane 19 bell crank 4359 to normal position will not permit operation of the carriage return mechanism or the tabulating mechanism in that cycle.

If, however, the link 1573 is pulled forwardly by depression of the crossfooter subtotal key 322, the link 4387 and arm 4379 will also be pulled forwardly to disengage the latter from the lane 20 control lever 4376 so that the carriage return control yoke 1581 will remain in effective position to cause a lane 2 controlled return movement of the paper carriage.

If in the same machine cycle a #7 control projection 1767 is encountered by the lane 15 sensing pin, the bell crank 2038 will, as disclosed in the Butler patent, be rocked to lower the roller 2035 only far enough to act on the cam arm (2039) of the line space control yoke 1727 to restore the latter to normal ineffective position without acting on the cam 2040 to suppress return movement of the paper carriage.

Practical examples of work in which the control mechanisms of the present invention are employed with great advantage are described in detail in our parent application and as they involve a very considerable amount of description of the operations of a considerable amount of other mechanism not described or illustrated in the present divisional application, the description and illustration of such examples is not repeated herein.

It is belived that the foregoing examples are sufficient to illustrate the advantages of the new carriage control mechanisms of the present invention. It will, however, be readily appreciated by those skilled in the art that the disclosed machine may be used with advantage for a great variety of kinds of work and may be embodied in other equivalent forms in various accounting machines.

We claim:

1. An accounting machine having a drive means, a plurality of cycle initiating means each operable to cause said drive means to drive the machine through a cycle of operation, a traveling carriage movable to any of a plurality of positions, means normally operating in each machine cycle to tabulate the carriage, means controlled by said carriage and rendered effective in a machine cycle performed with the carriage in a predetermined one of its positions to disable said tabulating means, and means controlled by one of said cycle initiating means to render said carriage-controlled means ineffective to disable said tabulating means.

2. An accounting machine having means to drive it through a cycle of operation, traveling carriage movable to any of a plurality of positions, means normally operating in each machine cycle to tabulate the carriage, normally disabled means to effect return movement of the carriage, a plurality of manipulative control members, means rendered effective by manipulation of one of said members to disable said tabulating means and enable said return means, a first means controlled by said carriage and thereby rendered effective in a machine cycle performed with the carriage in a first predetermined one of of said positions to disable said tabulating means, means rendered effective by manipulation of said one manipulative member to render said first carriage-controlled means ineffective to disable said tabulating means, a second means controlled by said carriage and thereby rendered effective in said first predetermined one of said carriage positions to disable said return means and re-enable said tabulating means, a third means controlled by said carriage and thereby rendered effective in a second predetermined one of said positions of the carriage to disable said return means and re-enable said tabulating means, and means rendered effective by manipulation of said one manipulative member to disable said third carriage-controlled means.

3. A cyclically operable accounting machine having a carriage movable to any of a series of positions, means operable in a machine cycle to move the carriage in a tabulating direction to other positions of said series, means operable in a machine cycle to move the carriage in a return direction to other positions of said series, a plurality of manipulative members each operable to enable said carriage return means, means controlled by said carriage and thereby rendered effective in at least a predetermined one of said positions of the carriage to disable said carriage return means and enable said carriage tabulating means, and means operable by at least one but less than all of said members to disable said carriage-controlled means from disabling said return means and enabling said tabulating means.

References Cited in the file of this patent

UNITED STATES PATENTS 2,711,855    Anderson _____ June 28, 1955